April 6, 1926.
C. L. JOHNSON
AUTOMOBILE LOCK
Filed May 27, 1921
1,579,768
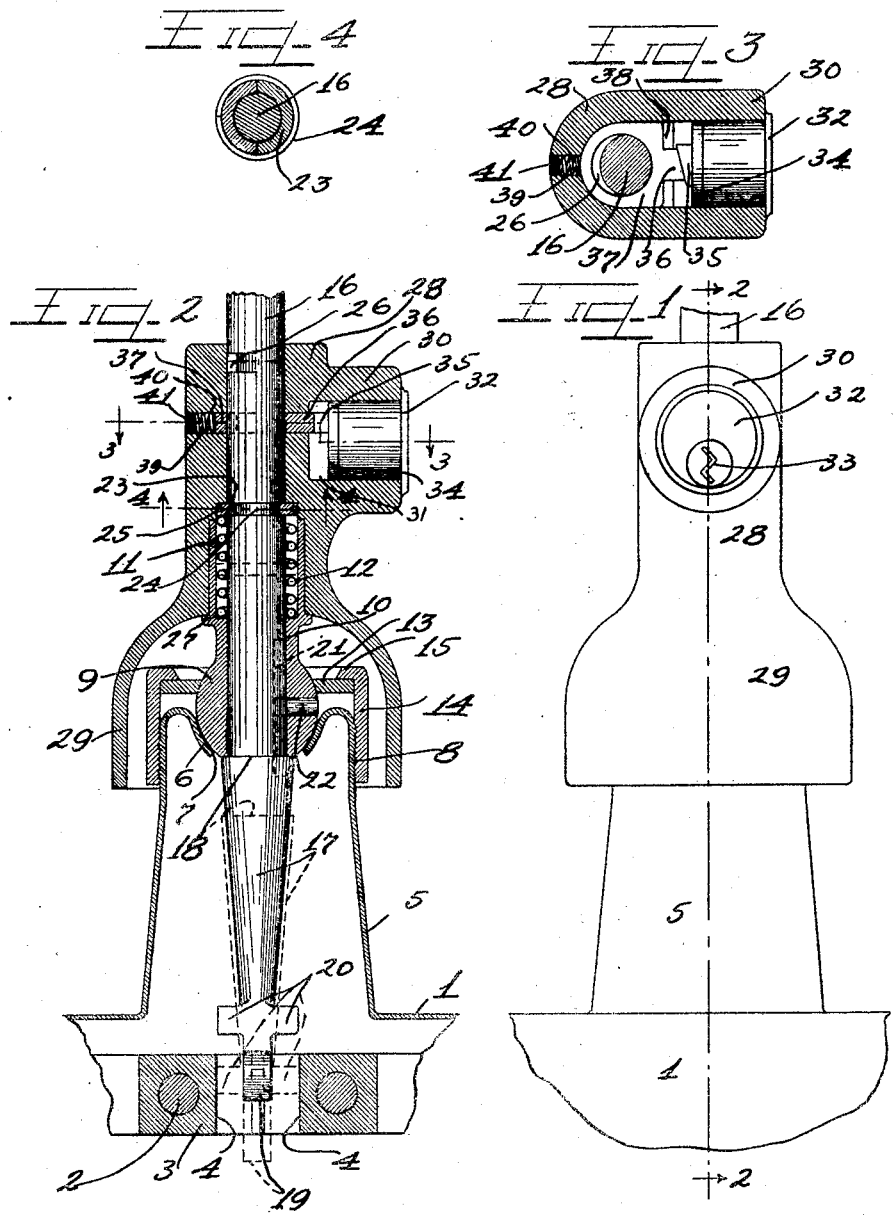

Patented Apr. 6, 1926.

1,579,768

UNITED STATES PATENT OFFICE.

COLVIN L. JOHNSON, OF CHICAGO, ILLINOIS, ASSIGNOR TO JOHNSON AUTOMOBILE LOCK CO., A CORPORATION OF ILLINOIS.

AUTOMOBILE LOCK.

Application filed May 27, 1921. Serial No. 473,176.

*To all whom it may concern:*

Be it known that I, COLVIN L. JOHNSON, a citizen of the United States, and a resident of the city of Chicago, in the county of Cook and State of Illinois, have invented certain new and useful Improvements in an Automobile Lock; and I do hereby declare that the following is a full, clear, and exact description of the same, reference being had to the accompanying drawings, and to the numerals of reference marked thereon, which form a part of this specification.

This invention relates more particularly to an improved type of an automobile gear shift lever lock wherein a spring supported gear shift lever projecting through a ball member is adapted to be slidably moved with respect to the ball member to compress the supporting spring and bring a notch in said lever into a position to permit a key releasable latch member to automatically engage in the lever notch to lock the lever against movement in a neutral position with locking lugs on the lower end of said lever engaging in the notches of gear shift blocks to prevent operation of the automobile transmission.

It is an object of this invention to provide an automobile lock wherein a gear shift lever is adapted to be slidably moved through a ball member into a locking position.

It is also an object of the invention to provide a vehicle lock wherein the gear shift lever is axially moved through its ball member to bring a lever notch into position to permit a locking latch to engage therein to hold the lever locked in neutral position.

A further object of the invention is the construction of a vehicle lock wherein locking lugs formed on the lower end of a gear shift lever are adapted to be seated between transmission gear shift blocks to hold the lever locked against movement.

It is furthermore an object of this invention to provide an automobile lock wherein a gear shift lever is adapted to be held in an elevated position for use by means of a spring disposed within a ball member with which the lever is slidably engaged.

Another object of the invention is to provide a slidable gear shift lever with gear shift locking lugs which when the lever is lowered are adapted to be held against retraction in a locking position by means of a spring controlled key releasable latch.

Still another object of the invention is the construction of an automobile lock wherein a spring supported gear shift lever having locking lugs thereon is adapted to be slidably moved through a ball member and through a latch to position the lugs between transmission gear shift blocks and permit the latch to seat in a lever notch to hold the lever locked against return to normal position by the lever supporting spring.

It is an important object of this invention to provide an automobile lock of simple and effective construction wherein locking lugs on a spring supported gear shift lever are adapted to be held in locking position within the notches of transmission blocks by means of a slidable key retractable latch through which the lever projects.

Other and further important objects of this invention will be apparent from the disclosures in the specification and the accompanying drawings.

The invention (in a preferred form) is illustrated in the drawings and hereinafter more fully described.

On the drawings:

Figure 1 is an elevation partly broken away and illustrating the supporting pedestal and hood of a gear shift lever equipped with a locking mechanism embodying the principles of this invention.

Figure 2 is a section taken on line 2—2 of Figure 1 showing parts in elevation.

Figure 3 is a detail section taken on line 3—3 of Figure 2.

Figure 4 is a detail section taken on line 4—4 of Figure 2.

As shown on the drawings:

The reference numeral 1 indicates an automobile transmission case having supported therein a pair of parallel stationary transmission rods 2. Slidably engaged on the rods 2 are a pair of transmission gear shift blocks 3 each provided with a notch 4 on the inner face thereof. Integrally formed on the top of the transmission case 1 is a hollow pedestal 5 the upper margin of which is bent inwardly to afford a socket 6 having a central opening 7 therein. The exterior of the upper end of the pedestal 5 is threaded at 8.

Adjustably seated in the pedestal socket 6 is a ball 9 having an upwardly directed extension 10 integrally formed thereon. The ball 9 and the ball extension 10 are axially passaged. The opening in the uper end of the ball extension 10 is enlarged to afford a chamber 11 wherein a coiled lever supporting spring 12 is seated. As illustrated in Figure 2 the ball 9 is held seated in the socket 6 by a retaining ring 13 and a collar 14. The collar 14 is threaded onto the threaded portion 8 of the pedestal 5 and is provided with an integral inwardly directed flange 15 which engages the retaining ring 13 to hold the same in place.

Slidably projecting through the ball 9 and the ball extension 10 is a gear shift lever 16 the lower end of which is enlarged and forms a downwardly tapering tail piece 17 having a shoulder 18 at the upper end. Integral with the lower end of the lever tail piece 17 is a block shift finger or tip 19. A pair of locking projections or lugs 20 are integrally formed on opposite sides of the lever tail piece directly above the shift finger 19. To prevent rotation of the lever 16 in the ball 9 the lever is provided with a longitudinal slot or groove 21 into which the inner end of a pin 22 projects. The pin 22 has the outer end rigidly secured in the ball 9.

The spring 12 is engaged around the lever 16 with the upper end thereof bearing against a two-section split ring 23 which seats in a peripheral groove 24 provided in the lever 16. A split band 25 is engaged around the ring 23 to hold the ring sections together. The spring 12 acts to hold the lever supported in a normal elevated position as shown in full lines in Figure 2. The shoulder 18 of the lever tail piece abuts against the ball 9 and limits the upward movement of the lever with respect to the ball. The gear shift lever 16 is provided with a crescent shaped notch 26 located a short distance above the peripheral groove 24.

Engaged on the upper end of the ball extension 10 above a flange 27 thereof is a shank 28 having an enlarged hood or cap 29 integrally formed on the lower end thereof to cover or enclose the upper end of the pedestal 5 and the ball socket members mounted thereon. A projection or boss 30 is integrally formed on one side of the shank 28. The boss 30 is provided with a chamber 31 wherein a pin lock 32 is mounted. The lock 32 is provided with a key slot 33 to permit a key to be inserted into the lock to cause rotation of the lock barrel 34 and a cam pin 35 integrally formed thereon and projecting toward the lever 16. The chamfered or beveled end of the cam pin 35 is adapted to be brought into contact with the chamfered or beveled end of a cam pin or projection 36 integrally formed centrally on one end of a locking bolt or latch plate 37. The latch plate 37 is provided with a circular opening through which the lever 16 projects. The latch plate 37 is slidably engaged in a transverse opening 38 of the shank 28 and engages against one end of a coiled spring 39 seated in a recess 40 in the shank 28. A plug 41 closes the outer end of the recess 40.

The operation is as follows:

In the normal unlocked position of the gear shift lever 16 the coiled spring 12 seated in the ball extension chamber 11 presses upwardly against the split ring 23 thereby holding the lever elevated as illustrated in full lines in Figure 2 with the latch 37 compressing the control spring 39. When the lever 16 is in an elevated normal operating position the locking lugs 20 are positioned above the transmission blocks 3. The lever tip 19 projects downwardly between the blocks 3.

To shift the gears of the transmission a composite movement of the gear shift lever 16 is necessary, that is, the lever must be thrown to one side and either forwardly or rearwardly for the purpose. The lever tip 19 is thus moved into the notch 4 of one of the gear shift blocks 3. The forward or rearward movement of the lever will now cause the engaged block 3 to be slidably shifted on its rod 2 to effect a desired shifting of the gears in the transmission. The gear shift lever is held against rotation by means of the pin 22 the inner end of which projects into the lever slot 21.

To lock the lever 16 from movement it is first moved into neutral position. The lever is then pushed inwardly or downwardly through the shank 28 and through the ball 9 into the dotted line locking position illustrated in Figure 2. With the downward movement of the lever the control spring 12 is compressed. The slot 21 permits the lever to move with respect to the pin 22. As the lever is pushed downwardly the locking lugs 20 thereof are moved between the blocks 3 and are engaged in the block notches 4 thereby holding the lever locked in neutral position and preventing a selective shifting of the gear shift blocks. With the downward movement of the lever 16 the crescent shaped notch 26 thereof is brought into a position to register with the latch 37 thereby permitting the compressed spring 39 to act automatically to slide the latch into the lever notch thus preventing retraction of the lever to release the locking lugs 20.

To unlock the gear shift lever 16 to permit operation of the transmission, a key is inserted into the pin lock key slot 33. By turning the key the lock barrel 34 is rotated thereby causing the cam 35 to act on the latch cam 36 to force the latch 37 out of the lever notch 26 against the action of the spring 39. With the latch 37 in release position the main spring 12 acts automatically to raise the lever into its normal operating position. The locking lugs 20 are thus elevated out of the block notches 4. The shoulder 18 at the upper end of the lever tail piece 17 is adapted to contact the ball 9 to limit the upward movement of the lever.

When the lever is in released operating position the shank 28 and the hood 29 may be elevated to permit access to the retaining members 13, 14 and 15 which hold the ball 9 seated in the socket 6.

When the lever is in locked position the ball and socket parts are inaccessible since the shank 28 and the hood 29 thereof are locked against upward movement on the lever 16 by latch 37 which engages in the lever notch 26.

I am aware that numerous details of construction may be varied through a wide range without departing from the principles of this invention, and I therefore do not purpose limiting the patent granted otherwise than necessitated by the prior art.

I claim as my invention:

1. A vehicle lock comprising a pedestal, a socket formed thereon, a ball seated in said socket, means for holding the ball in place, an extension on said ball, a lever slidable in said ball and extension, said lever having a notch and a peripheral groove therein, a ring engaged in said groove, a spring in said ball extension engaging said ring to hold the lever supported in an operative position, locking lugs on the lower end of the lever, a shank engaged on said ball extension, a hood formed thereon to cover said socket, said ball and said holding means, a latch in said shank through which the lever projects, a spring in said shank engaging said latch and adapted to project said latch into said lever notch when the lever is lowered to position the locking lugs in locking position, a cam extension on said latch, a lock in said shank, and a cam member thereon adapted to coact with said latch cam extension to cause retraction of the latch when the lock is operated by a key to permit return of the lever to normal position.

2. The combination with the notched gear shift blocks of a transmission, of a socket, a ball member therein, means for holding the ball seated in said socket, resilient means in said ball member, a notched lever slidably engaged in said ball member and supported on said resilient means, means for holding the lever against rotation in said ball member, locking members integrally formed on opposite sides of said lever, a hood member on said ball member for enclosing said socket and said holding means, a spring impelled latch in said hood member adapted to engage in said lever notch when the lever is lowered into a locked position to seat said locking members in said notched gear shift blocks, and a key operated lock device in said hood member for releasing the latch to permit the lever to be returned to its elevated operating position.

3. In a gear shift lever lock the combination with a ball member, of a lever slidably engaged therewith, a spring in said ball member for supporting said lever in operating position, locking lugs on said lever for holding the lever locked against movement when lowered, spring impelled latch means surrounding the lever for holding the lever locked against retraction in lowered position, and key operated means for releasing said latch means to permit return of the lever to normal operating position.

In testimony whereof I have hereunto subscribed my name.

COLVIN L. JOHNSON.